(12) United States Patent
Bhavaraju et al.

(10) Patent No.: US 9,011,650 B2
(45) Date of Patent: Apr. 21, 2015

(54) ELECTROCHEMICAL SYSTEMS AND METHODS FOR OPERATING AN ELECTROCHEMICAL CELL WITH AN ACIDIC ANOLYTE

(75) Inventors: Sai Bhavaraju, West Jordan, UT (US); Ashok V. Joshi, Salt Lake City, UT (US)

(73) Assignee: Ceramatec, Inc, Salt Lake City, UT (US)

( * ) Notice: Subject to any disclaimer, the term of this patent is extended or adjusted under 35 U.S.C. 154(b) by 774 days.

(21) Appl. No.: 13/269,412

(22) Filed: Oct. 7, 2011

(65) Prior Publication Data

US 2012/0085658 A1 Apr. 12, 2012

Related U.S. Application Data

(60) Provisional application No. 61/391,496, filed on Oct. 8, 2010.

(51) Int. Cl.
| | |
|---|---|
| *C25B 9/08* | (2006.01) |
| *C25B 15/02* | (2006.01) |
| *C25B 15/08* | (2006.01) |
| *C25B 3/00* | (2006.01) |
| *C25B 1/10* | (2006.01) |
| *C02F 1/467* | (2006.01) |
| *C02F 1/461* | (2006.01) |
| *C02F 101/10* | (2006.01) |

(52) U.S. Cl.
CPC . *C25B 9/08* (2013.01); *C25B 15/08* (2013.01); *C25B 1/10* (2013.01); *C25B 15/02* (2013.01); *Y02E 60/366* (2013.01); *C02F 1/4674* (2013.01); *C02F 2001/46185* (2013.01); *C02F 2201/46115* (2013.01); *C02F 2201/46135* (2013.01); *C02F 2201/4618* (2013.01); *C02F 2209/06* (2013.01); *C02F 2001/46138* (2013.01); *C02F 2101/101* (2013.01); *C25B 3/00* (2013.01)

(58) Field of Classification Search
None
See application file for complete search history.

(56) References Cited

U.S. PATENT DOCUMENTS 3,984,295 A 10/1976 Kametani et al.
4,066,519 A * 1/1978 Kadija et al. ............ 205/523

(Continued)

OTHER PUBLICATIONS

Lee, Jong K., "Written Opinion of the International Searching Authority", PCT/US2012/020822 (corresponding the U.S. Appl. No. 13/347,530 (Aug. 30, 2012), 1-3.

(Continued)

*Primary Examiner* — Harry D Wilkins, III
(74) *Attorney, Agent, or Firm* — David Fonda (57) ABSTRACT

An electrochemical cell having a cation-conductive ceramic membrane and an acidic anolyte. Generally, the cell includes a catholyte compartment and an anolyte compartment that are separated by a cation-conductive membrane. While the catholyte compartment houses a primary cathode, the anolyte compartment houses an anode and a secondary cathode. In some cases, a current is passed through the electrodes to cause the secondary cathode to evolve hydrogen gas. In other cases, a current is passed between the electrodes to cause the secondary cathode to evolve hydroxyl ions and hydrogen gas. In still other cases, hydrogen peroxide is channeled between the secondary cathode and the membrane to form hydroxyl ions. In yet other cases, the cell includes a diffusion membrane disposed between the secondary cathode and the anode. In each of the aforementioned cases, the cell functions to maintain the pH of a fluid contacting the membrane at an acceptably high level.

14 Claims, 8 Drawing Sheets

(56) References Cited

U.S. PATENT DOCUMENTS

| | | | |
|---|---|---|---|
| 4,110,191 A | | 8/1978 | Specht et al. |
| 4,213,833 A | | 7/1980 | Lefevre |
| 4,256,552 A | * | 3/1981 | Sweeney .................. 205/511 |
| 4,308,117 A | | 12/1981 | Sweeney |
| 5,290,405 A | * | 3/1994 | Joshi et al. .................. 205/338 |
| 5,366,605 A | * | 11/1994 | Wang .................. 210/96.2 |
| 5,427,658 A | * | 6/1995 | Allen .................. 205/556 |
| 5,580,430 A | * | 12/1996 | Balagopal et al. .......... 204/252 |
| 5,709,789 A | | 1/1998 | Shay et al. |
| 6,770,187 B1 | * | 8/2004 | Putter et al. .................. 205/560 |
| 2003/0024879 A1 | | 2/2003 | Carson et al. |
| 2004/0124094 A1 | | 7/2004 | Bo et al. |
| 2007/0138020 A1 | | 6/2007 | Balagopal et al. |
| 2008/0243671 A1 | | 10/2008 | Driscoll et al. |
| 2009/0107850 A1 | | 4/2009 | Fang et al. |
| 2009/0314652 A1 | | 12/2009 | Buschmann et al. |
| 2010/0044242 A1 | | 2/2010 | Bhavaraju et al. |
| 2012/0085657 A1 | | 4/2012 | Bhavaraju |

OTHER PUBLICATIONS

Lee, Jong K., "International Search Report", PCT/US2012/020822 (corresponding the U.S. Appl. No. 13/347,530, (Aug. 30, 2012),1-3.

Jo, Soo I., "International Search Report", PCT App. No. 2011/054968 (Corresponding the U.S. Appl. No. 13/253,771), (May 31, 2012),1-3.

Jo, Soo I., "Written Opinion of the International Searching Authority", PCT App. No. 2011/054968 (Corresponding the U.S. Appl. No. 13/253,771), (May 31, 2012),1-5.

Jo, Soo I., "International Search Report", PCT App. No. 2011/055458 (Corresponding to U.S. Appl. No. 13/269,412), (May 31, 2012),1-3.

Jo, Soo I., "Written Opinion of the International Searching Authority", PCT App. No. 2011/055458 (Corresponding to U.S. Appl. No. 13/269,412), (May 31, 2012),1-5.

* cited by examiner

ELECTROCHEMICAL SYSTEMS AND METHODS FOR OPERATING AN ELECTROCHEMICAL CELL WITH AN ACIDIC ANOLYTE

CROSS-REFERENCE TO RELATED APPLICATIONS

This application claims the benefit of U.S. Provisional Application No. 61/391,496, filed Oct. 8, 2010, entitled "Electrochemical Systems and Methods For Operating an Electrochemical Cell With an Acidic Anolyte," the entire disclosure of which is hereby incorporated by reference.

FIELD OF THE INVENTION

The present invention relates in general to electrochemical cells comprising a cation-conductive membrane. More particularly, the present invention discusses systems and methods for operating an electrochemical cell comprising an anode, a primary cathode, a secondary cathode, an acidic anolyte, and an alkali cation-conductive ceramic membrane, such as a NaSICON membrane, which is normally not compatible with acidic conditions. Generally, the secondary cathode acts to protect an anolyte side of the membrane from the acidic anolyte.

BACKGROUND OF THE INVENTION

Electrolytic cells comprising ceramic membranes that selectively transport ions are known in the art. By having an ion-selective membrane in the electrolytic cell, certain ions are allowed to pass between the cell's anolyte compartment and catholyte compartment and vice versa while other chemicals are maintained in their original compartments. Thus, through the use of an ion-specific membrane, an electrolytic cell can be engineered to be more efficient and to produce different chemical and electrochemical reactions than would otherwise occur without the membrane.

Figure 1:
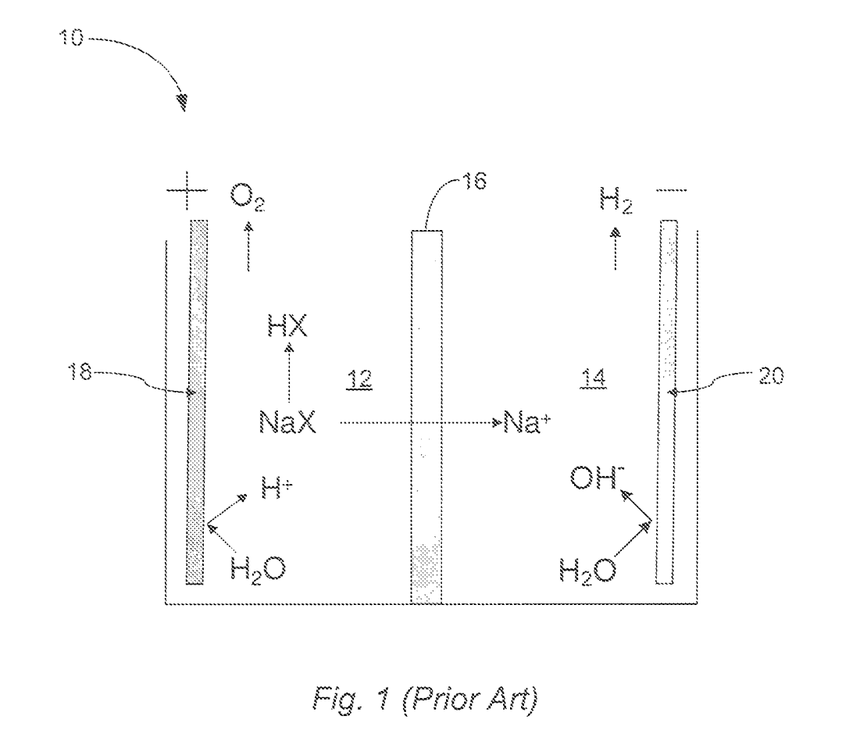
FIG. 1 depicts a schematic diagram of an embodiment of a prior art electrolytic cell comprising a cation-conductive membrane.

These ion-selective membranes can be selective to either anions or cations. Moreover, some cation-selective membranes are capable of selectively transporting specific alkali cations. By way of example, NaSICON (Na Super Ion CONducting) membranes selectively transport sodium cations, while LiSICON (Li Super Ion CONducting) and KSICON (K Super Ion CONducting) membranes selectively transport lithium and potassium cations, respectively. Electrolytic cells comprising alkali cation-selective membranes are used to produce a variety of different chemicals and to perform various chemical processes. In some cases, such electrolytic cells convert alkali salts into their corresponding acids. In other cases, such electrolytic cells may also be used to separate alkali metals from mixed alkali salts. One non-limiting example of a conventional 2-compartment electrolytic cell 10 is illustrated in FIG. 1. Specifically, FIG. 1 illustrates the cell 10 comprises an anolyte compartment 12 and a catholyte compartment 14 that are separated by a NaSICON membrane 16.

During operation, the anolyte compartment 12 comprises an aqueous or an organic solution (such as an alcohol), sodium salt solution (NaX, wherein X comprises an anion capable of combining with a sodium cation to form a salt) and current is passed between an anode 18 and a cathode 20. Additionally, FIG. 1 shows that as the cell 10 operates, water ($H_2O$) is split at the anode 18 to form oxygen gas ($O_2$) and protons ($H^+$) through the reaction $2H_2O \rightarrow O_2 + 4H^+ + 4e^-$. FIG. 1 further shows that the sodium salt NaX in the anolyte solution is split (according to the reaction $NaX + H^+ \rightarrow HX + Na^+$) to (a) allow sodium cations ($Na^+$) to be transported through the NaSICON membrane 16 into the catholyte compartment 14 and (b) to allow anions ($X^-$) to combine with protons to form an acid (HX) that corresponds to the original sodium salt.

The above-mentioned electrolytic cell may be modified for use with other alkali metals and acids corresponding to the alkali salts used in the anolyte. Moreover, it will be appreciated that other electrolytic reactions may occur which result in proton formation and corresponding lowering of pH within the anolyte compartment. Low pH anolyte solutions in such electrolytic cells have shortcomings. In one example, at a lower pH, such as a pH less than about 5, certain alkali-ion-conductive ceramic membranes, such as NaSICON membranes, become less efficient or unable to transport alkali cations. Accordingly, as the electrolytic cell operates and acid is produced in the anolyte compartment, the cell becomes less efficient or even inoperable. In another example, acid produced in the anolyte compartment can actually damage the cation selective membrane, such as a NaSICON membrane, and thereby shorten its useful lifespan.

Thus, while electrolytic cells comprising a catholyte compartment and an anolyte compartment that are separated by a cation-conductive membrane are known, challenges still exist, including those mentioned above. Accordingly, it would be an improvement in the art to augment or even replace current electrolytic cells with other cells or methods for using the cells.

BRIEF SUMMARY OF THE INVENTION

The present invention provides systems and methods for operating a two-compartment electrochemical cell having a cation-conductive ceramic membrane with an acidic anolyte solution. The present invention also provides systems and methods for operating a multi-compartment electrochemical cell having a cation-conductive ceramic membrane adjacent to an acidic solution. Generally, the described systems and methods act to protect the ceramic membrane and keep it functioning in acidic conditions during electrolysis.

In some implementations, the described electrochemical cell comprises an anolyte compartment and a catholyte compartment that are separated by a cation-conductive ceramic membrane, such as a NaSICON-type membrane. In the cell, the anolyte compartment comprises an anode that is positioned to contact the anolyte solution. Similarly, the catholyte compartment comprises a primary cathode that is positioned to contact a catholyte solution. Moreover, the cell also comprises a secondary cathode that is disposed in the anolyte compartment, adjacent to an anolyte side of the cation-conductive membrane. The cell also comprises a power source that is capable of passing current between the anode and the primary cathode and/or the secondary cathode. When the power source is used to pass current between the electrodes, the anolyte solution may become more acidic. Importantly, however, as the cell functions, the secondary cathode helps maintain the pH of the fluid in contact with the membrane's anolyte side at an acceptable pH that allows the membrane to efficiently transport alkali cations and that does not damage the membrane.

The cell may function in any suitable manner. In a first non-limiting example, the secondary cathode is operated at an electrical potential that causes the secondary cathode to convert protons ($H^+$) evolved at the anode into hydrogen gas ($H_2$). In this manner, the secondary cathode reduces the amount of protons that contact the membrane's anolyte side and/or reduces the amount of protons that are available to form acids in the anolyte solution. Accordingly, the secondary cathode, in this example, may maintain the pH of the fluid contacting the anolyte side of the membrane at an acceptable pH.

In a second non-limiting example, the secondary cathode is operated at an electrical potential that causes the secondary cathode to split water ($H_2O$) into hydroxyl ions ($OH^-$) and hydrogen gas ($H_2$). The hydroxyl ions evolved at the secondary cathode can help maintain an acceptable pH for the fluid contacting the anolyte side of the membrane in any suitable manner. For instance, the hydroxyl ions produced by the secondary cathode may react with protons evolved at the anode to form water and, thereby, prevent the protons or acids formed therewith from damaging the anolyte side of the membrane.

In a third non-limiting example, the cell comprises a fluid inlet that allows one or more chemicals to be channeled into a space between the membrane and the secondary cathode. In this example, any suitable chemical can be introduced between the membrane and the secondary cathode. In some cases, however, hydrogen peroxide ($H_2O_2$) is fed between the membrane and the secondary cathode. In such cases, the secondary cathode is operated at a potential that allows the secondary cathode to reduce the hydrogen peroxide to hydroxyl ions according to the reaction $H_2O_2 + 2e^- \rightarrow 2OH^-$, which may help maintain the fluid in contact with the anolyte side of the membrane at an acceptable level. Ammonia can also be used in the place of hydrogen peroxide.

In a fourth non-limiting example, the cell comprises a diffusion barrier that separates the anolyte compartment into an anode space, which houses the anode, and a secondary cathode space, which houses the secondary cathode. In this example, the diffusion barrier may serve any suitable purpose. For instance, the diffusion barrier may limit the rate at which the fluid in the anode space mixes with the fluid in the secondary catholyte space. Thus, the diffusion barrier may allow the fluid in the anode space to have a pH that is lower than the pH of the fluid in the secondary cathode space. Accordingly, the cell may efficiently produce desired chemical products in the anode space while the fluid in contact with the membrane's anolyte side (within the secondary cathode space) is maintained at an acceptable pH. In one other example, the diffusion barrier comprises a membrane or separator that is porous or permeable to at least cations which later pass through the ceramic cation-conductive membrane. In other example, the diffusion barrier comprises a cation-exchange membrane that transports cations which later pass through the ceramic cation-conductive membrane. The diffusion barrier may be a porous film, a micro or nano porous separator, an ion-exchange membrane.

In a fifth non-limiting example, the secondary cathode comprises an insulative separator that is disposed on a side of the secondary cathode that faces the anode. In this example, the side of the secondary cathode that faces the cation-conductive membrane is able to electrochemically reduce or otherwise react with chemicals (e.g. water or hydrogen peroxide) to maintain the fluid in contact with the membrane's anolyte side at an acceptable pH level. At the same time, the separator may prevent (or reduce the likelihood of) the surface of the secondary cathode that faces the anode from reducing or reacting with chemicals generated at the anode. As a result, the insulative separator allows the secondary cathode to protect the membrane's anolyte side, while preventing (or reducing the likelihood of) the secondary cathode from producing chemical products that will react with and/or neutralize chemical products produced at the anode.

In a sixth non-limiting example, the secondary cathode only extends across a portion of the membrane's anolyte side that may otherwise be contacted by an acidic anolyte having a pH that is detrimental to the membrane's efficiency and/or structural integrity. Because the secondary cathode in this example only extends across a portion of the membrane's anolyte side, as opposed to the entire anolyte side, the secondary cathode may protect the membrane where it would most likely be damaged. The shortened cathode will also create less resistance to the transport of alkali ions from anode to the primary cathode compartment compared to the full sized cathode. Furthermore, the shortened secondary cathode may also produce less chemical products to react with and/or neutralize the chemical products produced by the anode than would a full size secondary cathode. Accordingly, the use of a shortened secondary cathode may act to further increase the cell's overall efficiency at producing one or more desired chemical products.

While the described systems and methods are particularly useful for separating sodium from mixed alkali salts, for producing acids that correspond to sodium salts (e.g. sulfuric acid from sodium sulfate, acetic acid from sodium acetate), and for obtaining sodium hydroxide, the skilled artisan will recognize that the described systems and methods can be modified to be used in a variety of electrochemical processes where it is desirable to operate the anode at a pH lower than the typical safe working pH of NaSICON-type conductive membranes. It will further be appreciated that the apparatus and methods within the scope of the present invention may be used in relation to other alkali metals besides sodium. For example, instead of using an electrochemical cell that includes a NaSICON membrane and an anolyte solution with a sodium salt (NaX), the described systems and methods may be used with any other suitable alkali salt (e.g., LiX, KX, etc.) and with any other suitable alkali-cation-conductive membrane (e.g., a LiSICON membrane, a KSICON membrane, etc.) that is capable of transporting cations (e.g., $Li^+$, $K^+$, etc.) from the anolyte compartment to the catholyte compartment. For example, a membrane capable of conducting Li ions may be LiSICON, $La_xLi_yTiO_{3-z}$ type perovskite, $Li_2O$—$Al_2O_3$—$TiO_2$—$P_2O_5$ glass or $Li_2S$—$P_2S_5$ Thio-LiSICON.

These features and advantages of the present invention will become more fully apparent from the following description and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of suitable cation-conductive membranes, anolytes, catholytes, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention relates to systems and methods for operating an electrochemical cell comprising a cation-conductive membrane and an acidic anolyte solution. Generally, the described systems and methods act to protect the membrane and keep it functioning as acid is produced in the anolyte solution. Accordingly, while the described systems and methods protect the cation-conductive membrane, they also allow the cell to produce acids corresponding to alkali salts, to produce pure alkali metals, to produce alkali bases, and/or to produce a variety of other chemical products. To provide a better understanding of the described systems and methods, the electrochemical cell is first described, followed by a description of a variety of methods for using the cell.

Figure 2:
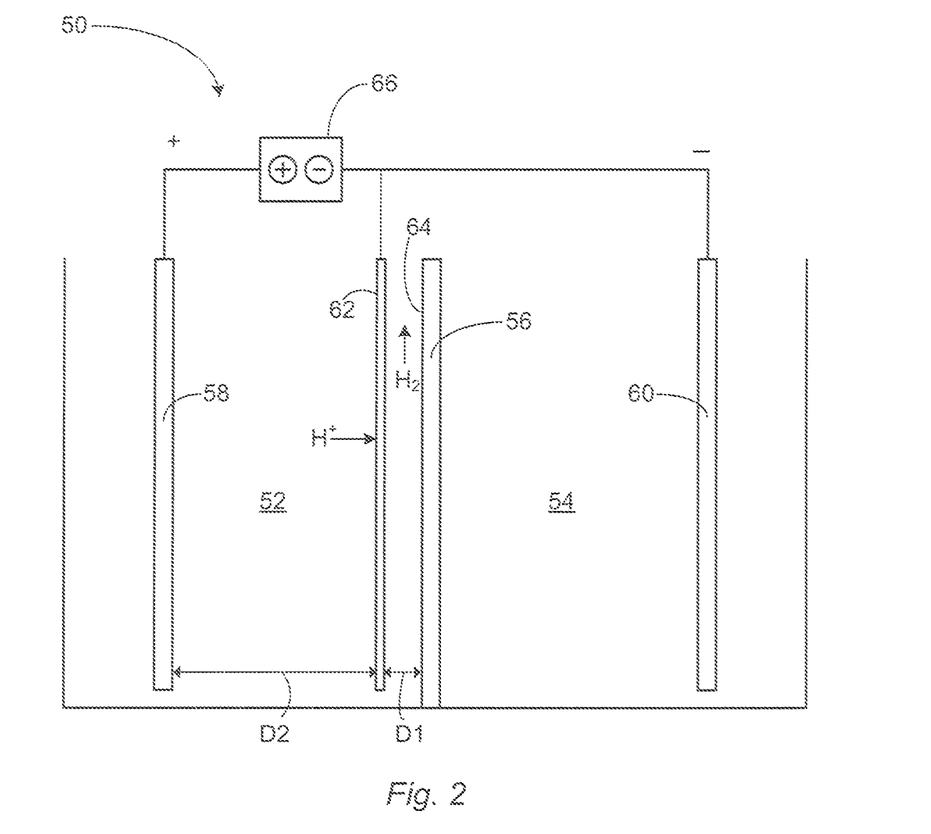
FIG. 2 depicts a schematic diagram of a representative embodiment of an electrochemical cell comprising a cation-conductive membrane and a secondary cathode that is configured to evolve hydrogen gas.

The electrochemical cell can comprise any suitable component that allows it to produce a desired chemical product. By way of illustration, FIG. 2 illustrates a representative embodiment in which the electrochemical cell 50 comprises an anolyte compartment 52 and a catholyte compartment 54 that are separated by a cation-conductive ceramic membrane 56. FIG. 2 further shows that while the anolyte compartment 52 houses an anode electrode 58 that is positioned to contact an anolyte solution or anolyte (not shown), the catholyte compartment 54 comprises a primary cathode electrode 60 that is positioned to contact a catholyte solution or catholyte (not shown). Moreover, FIG. 2 shows that a secondary cathode electrode 62 is disposed in the anolyte compartment 52, adjacent to an anolyte side 64 of the membrane 56. FIG. 2 also shows that the cell 50 comprises a power source 66 that is capable of passing current between the anode 58 and both the primary 60 and the secondary 62 cathodes. Generally, as current passes between the electrodes and as acid is formed in the anolyte, the secondary cathode 62 acts to maintain the pH of the fluid in contact with the anolyte side of the membrane 56 at an acceptable level. In other words, as the cell functions, the secondary cathode 62 helps keep the pH of the fluid contacting the membrane's anolyte side high enough that the membrane 56 functions efficiently and is not damaged by the fluid.

With respect to the anode electrode 58, the anode can comprise one or more of a variety of materials that allow it to evolve protons ($H^+$) and generate oxygen by water splitting or to initiate another desired electrolytic reaction at the anode 58 when the anode is contacted with an aqueous anolyte or an organic solution (such as an alcohol) and when current is running between the anode 58 and the primary cathode 60 and/or the secondary cathode 62. Some non-limiting examples of suitable anode materials comprise dimensionally stabilized anode-$IrO_2+Ta_2O_5$ on titanium (DSA), platinized titanium, ruthenium (IV) dioxide ($RuO_2$), Mo—Fe—W alloy and other suitable known or novel anode materials.

The primary cathode electrode 60 can comprise any suitable material that allows it to be stable in a caustic catholyte and to initiate a desired electrolytic reaction when current passes between the primary and secondary cathodes and the anode. Similarly, the secondary cathode 62 can comprise any suitable material that allows it to be stable in an neutral to acidic environment and to initiate a desired electrochemical reaction (e.g. reduction of water to generate hydroxide ions) when current passes between it and the anode. Some non-limiting examples of suitable materials that can be used in the primary and/or secondary cathodes include nickel, stainless steel, graphite, a nickel-cobalt-ferrous alloy (e.g., a KOVAR® alloy), and other known or novel cathode materials. Some non-limiting examples of suitable materials that can be used as the secondary cathodes include nickel, stainless steel, graphite, a nickel-cobalt-ferrous alloy (e.g., a KOVAR® alloy), various types of hard and soft carbons, silicon, silicon carbide, nickel-phosphorous alloy, alloy 22, platinized titanium and other known or novel cathode materials. Additionally, in some embodiments, the secondary cathodes comprise an electro-catalyst, such as platinum, ruthenium or cobalt complexes of porphyrin or glyoxime or tetraamine or dithiolene that increases one or both of the cathodes' ability to evolve hydrogen.

While the primary and the secondary cathodes may have the same material composition, in some embodiments, the secondary cathode comprises a different material composition than the primary cathode. Said differently, the secondary cathode 62 may comprise one or more different materials or different amounts of one or more materials than the primary cathode 60. In one embodiment, the cathode materials may be chosen because of the pH value that the primary cathode sees (e.g. >13) compared to that at the secondary cathode (e.g. <10). The cathode materials may depend on the different electrolyte chemistry at the primary cathode (e.g. sodium hydroxide) compared to that at the secondary cathode (e.g. sodium nitrate).

Where the secondary cathode 62 comprises a different material composition than the primary cathode 60, the secondary cathode's material composition may provide that cathode with any suitable characteristic. Indeed, in some embodiments, the material composition of the secondary cathode allows it to evolve hydrogen gas more easily from near neutral solutions than the primary cathode. By way of non-limiting example, the secondary cathode may comprise an electro-catalyst, such as silicon or platinum or cobalt porphyrin, while the primary cathode does not.

In addition to the aforementioned characteristics, the primary and secondary cathode may comprise any other suitable characteristic. In one non-limiting example, the primary and/or secondary cathode has a mesh structure, a porous structure, a micro-porous structure, a perforated structure, or another structure that allows ions to pass therethrough. Indeed, in some preferred embodiments, the secondary cathode has a mesh structure that allows alkali cations to pass freely through the structure.

The secondary cathode 62 can be placed any suitable distance from the membrane that allows the cell to function and allows the secondary cathode to help keep the fluid that contacts the membrane at an acceptable pH level (e.g., above about 5). In some preferred embodiments, FIG. 2 shows that the secondary cathode 62 is disposed adjacent to the membrane 56 so that the distance D1 between the membrane 56 and the secondary cathode 62 is smaller than the distance D2 between the secondary cathode 62 and the anode 58.

Regarding the power source, FIG. 2 shows the power source 66 can be connected to the anode 58 and to the primary 60 and secondary 62 cathodes to apply a voltage and current between the electrodes to drive reactions within the electrochemical cell 50. This power supply can be any known or novel power supply that is suitable for use with the electrochemical cell. The power supply can either continuously supply a fraction of the current to secondary cathode or do it intermittently.

With respect to the cation-conductive membrane, the membrane 56 can comprise virtually any known or novel alkali cation-conductive ceramic membrane that is capable of selectively transporting specific alkali cations (e.g., $Na^+$, $Li^+$, $K^+$, etc.) from the anolyte compartment 52 to the catholyte compartment 54. Some non-limiting examples of suitable cation-conductive membranes include any known or novel type of NaSICON membrane (including, but not limited to, a NaSICON-type membrane produced by Ceramatec, Inc., Salt Lake City, Utah), Li ion conducting LiSICON, $La_xLi_yTiO_{3-z}$ type perovskite, $Li_2O$—$Al_2O_3$—$TiO_2$—$P_2O_5$ glass or $Li_2S$—$P_2S_5$ Thio-LiSICON types, KSICON membrane, and any other suitable cation-conductive ceramic membrane, such as NaFION® membrane, produced by DuPont. In some preferred embodiments, however, the cation-conductive membrane comprises a membrane, such as a NaSICON membrane, which is capable of selectively transporting sodium cations from the anolyte compartment to the catholyte compartment. In some more preferred embodiments, the cation-conductive membrane comprises a NaSICON-type membrane that is operable at lower pHs (e.g., pHs between about 4 and about 6).

With regard to the anolyte solution in the anolyte compartment, the anolyte can initially comprise virtually any solution that allows the anode to evolve protons or to initiate one or more of other desired electrochemical reactions when current passes between the anode and the primary and/or secondary cathodes. In some non-limiting embodiments, however, the anolyte comprises an alkali-salt solution, including, but not limited to an aqueous alkali-salt solution. For instance, where the cation-conductive membrane comprises a NaSICON-type membrane, the anolyte can comprise a sodium salt (NaX), which may include, but is not limited to, sodium lactate ($NaC_3H_5O_3$), sodium nitrate ($NaNO_3$), sodium sulfate ($Na_2SO_4$), and/or sodium chloride (NaCl). Similarly, when the cation-conductive membrane comprises a LiSICON membrane or a KSICON membrane, the anolyte can respectively comprise any suitable lithium salt (LiX) or potassium salt (KX), including, but not limited to, lithium or potassium salts corresponding to the sodium salts mentioned above.

The catholyte solution can comprise virtually any solution that allows the primary cathode to evolve hydroxide ions or to cause another desired electrochemical reaction when the catholyte is in contact with the primary cathode and when current passes between the anode and the primary cathode. In some preferred embodiments, however, the catholyte solution comprises, but is not limited to, water, an aqueous alkali-salt solution, a hydroxide solution (e.g., an alkali hydroxide), an organic solution (such as an alcohol), an alkali base, and/or combinations thereof. By way of non-limiting example, where the cation-conductive membrane comprises a NaSICON membrane, the catholyte solution can comprise an aqueous sodium chloride solution, an aqueous sodium hydroxide solution, an organic sodium methylate solution, etc. Similarly, where the cation-conductive membrane comprises a LiSICON membrane, the catholyte solution may comprise an aqueous solution of lithium chloride, lithium hydroxide, etc. Moreover, where the cation-conductive membrane comprises a KSICON membrane, the catholyte solution may comprise an aqueous solution of potassium chloride, potassium hydroxide, etc.

While not shown in FIG. 2, the various compartments of the electrochemical cell may also comprise one or more fluid inlets and/or outlets. In some embodiments, the fluid inlets allow specific chemicals and fluids to be added to one or more desired places within the cell. For instance, the fluid inlets may allow a chemical to be added to the anolyte compartment, to the catholyte compartment, to a space between the membrane and the secondary cathode, and/or to any other suitable location within the cell. In other embodiments, the fluid inlets and outlets may allow fluids to flow through one or more compartments or spaces in the cell.

The described electrochemical cell can be used in any suitable manner to form a variety of chemical products. To provide a better understanding of the electrochemical cell, several non-limiting embodiments of methods for using the cell are described below with reference to FIGS. 2 through 8.

FIG. 2 illustrates a first non-limiting embodiment in which the cell 50 is operated in a manner that causes protons $H^+$ evolved at the anode to be converted to hydrogen gas $H_2$ at the secondary cathode 62 through the reaction $2H^+ + 2e^- \rightarrow H_2$ that is dependent on the pH near the secondary cathode (standard reduction potential is 0 V at pH=1 and −0.828V at pH=14 and will have additional overpotential at practical current densities). By converting protons in the anolyte into hydrogen gas, the secondary cathode in this embodiment helps maintain the pH of the fluid contacting the membrane at an acceptable level.

Where the secondary cathode converts protons to hydrogen gas, the cell may be operated at any suitable electrical potential that a) allows the reduction of protons to hydrogen gas to preferentially occur at the secondary cathode over the reduction of alkali cations (e.g., $Na^+$) to alkali metals and b) maintains the pH of the fluid in contact with the anolyte side of the membrane at an acceptable level.

To improve the cell's ability to reduce protons to hydrogen gas at the secondary cathode, in some embodiments (as previously mentioned), the secondary cathode comprises one or more materials, such as platinum or another electro-catalyst, that cause the cell to preferentially reduce protons to hydrogen gas at the secondary cathode over the primary cathode. Examples of such materials may include nickel, stainless steel, graphite, a nickel-cobalt-ferrous alloy (e.g., a KOVAR® alloy), various types of hard and soft carbons, silicon, silicon carbide, nickel-phosphorous alloy, alloy 22, platinized titanium and other known or novel cathode materials.

In some embodiments, in order to increase the cell's ability to reduce protons to hydrogen gas at the secondary cathode, the secondary cathode comprises a material that generally enables electrochemical reactions to occur more efficiently at the secondary cathode than at the primary cathode. For instance, the secondary cathode can comprises a material that is more electrocatlytic to hydrogen at near neutral pH values that are expected near the membrane, that operates at a lower current, and/or that naturally draws more current than the material used for the primary cathode. In one non-limiting example, where the primary cathode comprises nickel that is an efficient hydrogen evolver at near neutral pH's, the secondary cathode comprises one or more of nickel, stainless steel, graphite, a nickel-cobalt-ferrous alloy (e.g., a KOVAR® alloy), various types of hard and soft carbons, silicon, silicon carbide, nickel-phosphorous alloy, alloy 22, platinized titanium and other known or novel cathode materials, tungsten oxide, tungsten carbide, and other cathodes known to those of skill in the art to split water in neutral to acidic aqueous or organic solutions.

Figure 3:
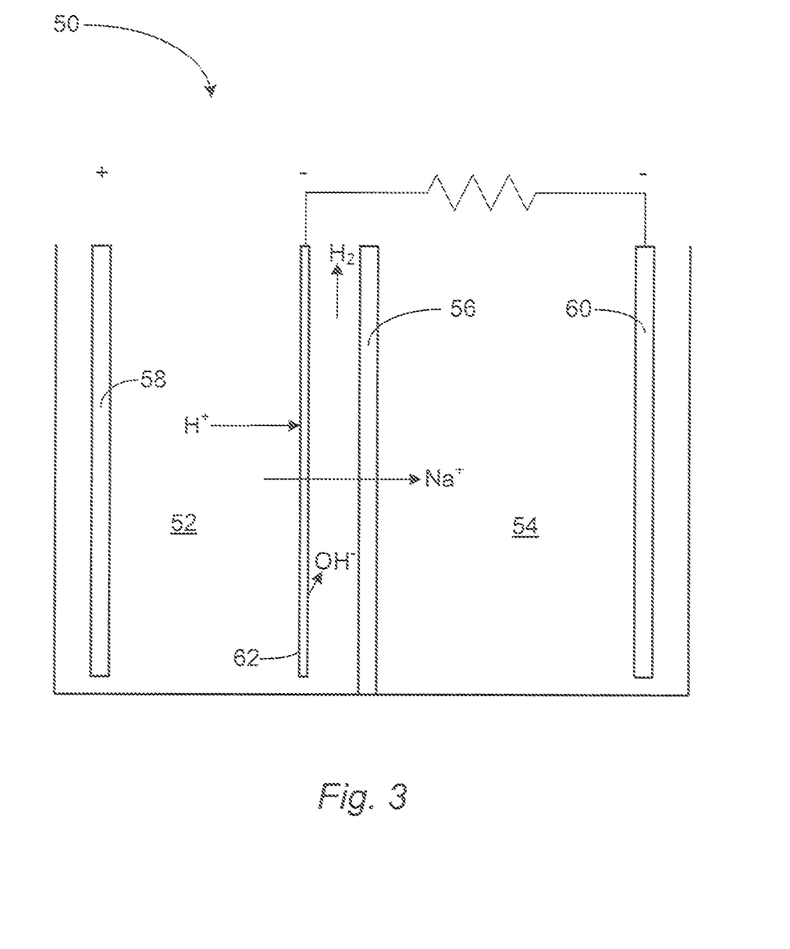
FIG. 3 depicts a schematic diagram of a representative embodiment of the electrochemical cell comprising the cation-conductive membrane and the secondary cathode, wherein the secondary cathode is configured to evolve hydroxyl ions and hydrogen gas.

FIG. 3 illustrates a second non-limiting embodiment of the cell 50 and a method for using the cell 50. Specifically, FIG. 3 illustrates that the cell 50 can be operated in a manner that causes water ($H_2O$) to be split at the secondary cathode 62 to from hydroxyl ions ($OH^-$) and hydrogen gas ($H_2$) through the reaction $2H_2O+2e^- \rightarrow 2OH^- + H_2$. This reaction may depend on the pH near the secondary cathode. In some embodiments, the standard reduction potential is 0 V at pH=1 and −0.828V at pH=14 and will have additional overpotential at practical current densities. As the secondary cathode produces hydroxyl ions near the anolyte side of the membrane, the pH of the fluid in contact with the membrane is maintained at a suitable level. For example, the hydroxyl ions may react with protons that are released into the anolyte solution by the anode to form water. Accordingly, the secondary cathode in this embodiment can prevent the acidic anolyte from damaging the anolyte side of the membrane.

Where the secondary cathode 62 splits water to produce hydroxyl ions and hydrogen gas, the cell may be operated at any suitable electrical potential that allows the secondary cathode to split water and to maintain the pH of the fluid in contact with the anolyte side of the membrane at a suitable level. In some instances, however, the electrical potential between the secondary cathode 62 and the anode 58 in this second embodiment is higher than the electrical potential between the secondary cathode and the anode in the first non-limiting embodiment described above in relation to FIG. 2. In one non-limiting example, in order to split water into hydroxyl ions and hydrogen gas, as opposed to reducing protons evolved at the anode to hydrogen gas, at STP, the voltage passing between the secondary cathode and the anode in this second non-limiting embodiment is about 0.8±0.3 volts higher than the voltage passing between the secondary cathode and the anode in the first non-limiting embodiment described above.

Figure 4:
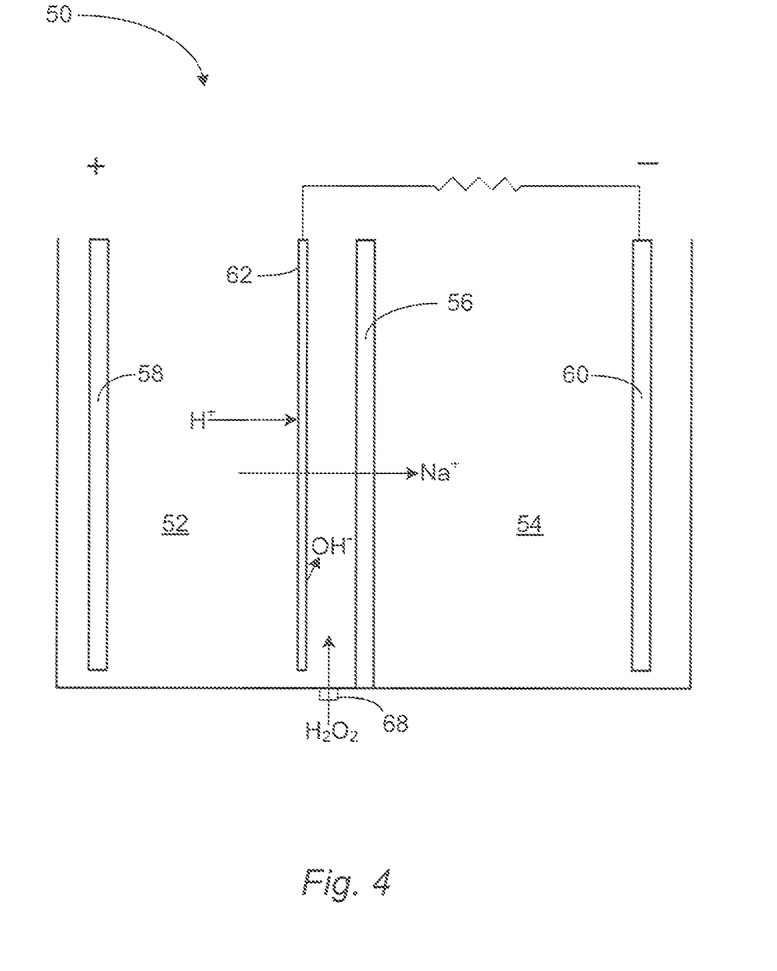
FIG. 4 depicts a schematic diagram of a representative embodiment of the electrochemical cell, wherein the cell comprises a fluid inlet that allows a chemical, such as hydrogen peroxide, to be channeled into a space between the membrane and the secondary cathode.

FIG. 4 illustrates a third non-limiting embodiment of the electrochemical cell 50 in which the cell 50 comprises a fluid inlet 68 that is capable of introducing a chemical between the membrane 56 and the secondary cathode 62. In such an embodiment, the fluid inlet 68 may be used to introduce any suitable chemical between the membrane and the secondary cathode that helps to maintain the pH of the fluid in contact with the anolyte side of the membrane at an acceptable level. In one non-limiting example, FIG. 4 shows that hydrogen peroxide ($H_2O_2$) is introduced through the fluid inlet 68 into the space between the membrane 56 and the secondary cathode 62. In this example, hydrogen peroxide $H_2O_2$ is reduced at the secondary cathode to produce hydroxyl ions $OH^-$ through the reaction $H_2O_2+2e^- \rightarrow 2OH^-$. The basic pH of the hydroxyl ions produced in this example may help maintain the pH of the fluid in contact with the anolyte side of the membrane 56 at a level that is sufficiently high to allow the membrane to function efficiently. Additionally, because the hydroxyl ions evolved at the secondary cathode may react with protons evolved from the anode to form water, the introduction of hydrogen peroxide may reduce the amount of hydrogen gas that is evolved at the secondary cathode. Because hydrogen gas bubbles that form on the membrane may increase the membrane's resistance, channeling hydrogen peroxide between the membrane and the secondary cathode may reduce the membrane's resistance and, thereby, increase the cell's overall efficiency. Alternatively, ammonia can be used in the place of hydrogen peroxide. The ammonia reacts with the protons generated at the anode and the hydroxyl ions reacted at the cathode to form ammonium hydroxide according to the following reaction: $NH_3+H^+ + H_2O+e^- \rightarrow NH_4OH + 1/2H_2$. The ammonium hydroxide then maintains a favorable pH near the membrane. In one embodiment, the anolyte compartment comprises an amount of ammonium hydroxide disposed between the cation-conductive membrane and the secondary cathode.

Where hydrogen peroxide is introduced between the membrane and the secondary cathode, any suitable amount of hydrogen peroxide may be added that allows the cell to maintain the pH of the fluid contacting the membrane at an acceptable level. Indeed, the amount of hydrogen peroxide needed to maintain a suitable pH level for the fluid in contact with the anolyte side of the membrane may vary on a variety of factors, such as the strength of the acid being produced in the anolyte compartment, the size of the compartment, the optimal pH functioning range of the membrane, etc. By way of non-limiting example, where the acid being produced in the anolyte compartment comprises a strong acid, such as nitric acid, more hydrogen peroxide may be required to maintain a suitable pH level near the membrane than where the acid being produced in the anolyte compartment comprises a weak acid, such as citric acid.

Furthermore, where hydrogen peroxide is introduced into the cell, the cell may operate with any suitable electrical potential between the anode 58 and the secondary cathode 62 that allows the cell to produce the desired chemical products and to maintain the pH of the fluid in contact with the anolyte side of the membrane at an acceptable level.

Figure 5:
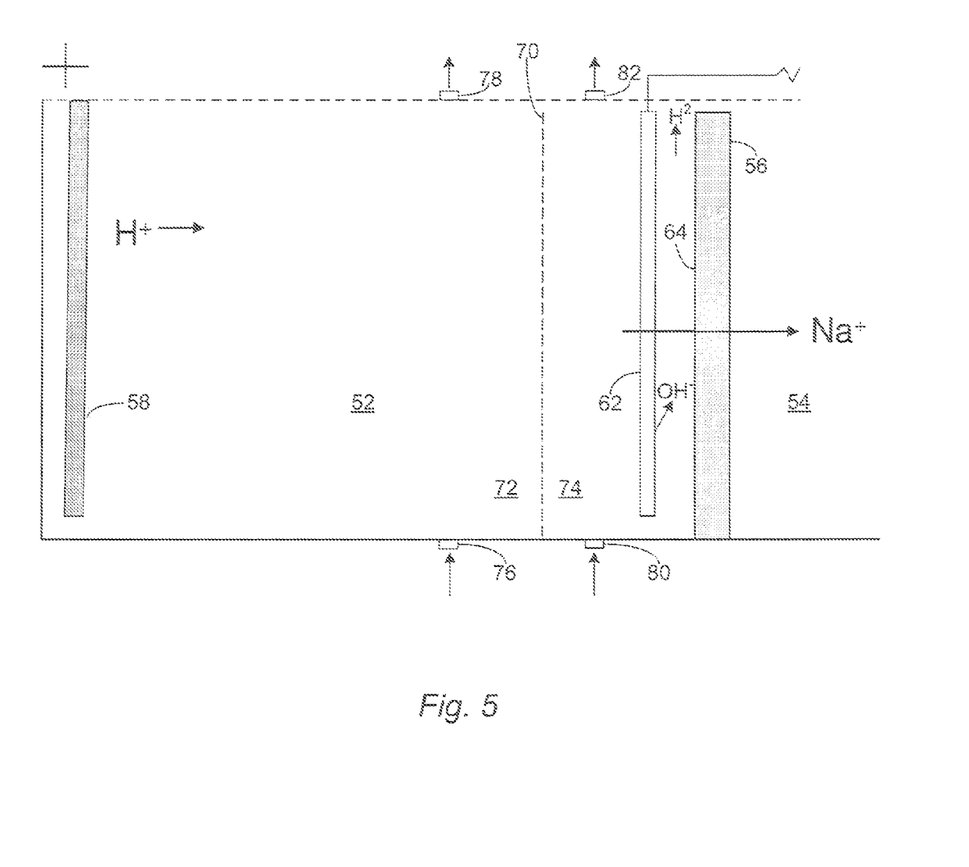
FIG. 5 depicts a schematic diagram of a representative embodiment of the electrochemical cell in which a diffusion barrier is disposed in the anolyte compartment between the secondary cathode and the anode.

FIG. 5 shows a fourth non-limiting embodiment in which the cell 50 further comprises a diffusion barrier 70 disposed between the secondary cathode 62 and the anode 58 to separate the anolyte compartment 52 into an anode space 72, which holds the anode 58, and a secondary cathode space 74, which holds the secondary cathode 62. The diffusion barrier 70 may perform a variety of functions, such as holding a fluid, which has a higher pH than a fluid in the anode space 72, in contact with the anolyte side 64 of the membrane 56; limiting the rate at which chemicals from the anode space 72 can mix with chemicals from the secondary cathode space 74; and allowing current and ions (e.g., $H^+$, $Na^+$, $Li^+$, $K^+$, etc.) to pass therethrough.

The diffusion barrier 70 can comprise any suitable characteristic that allows it to be stable in the anolyte solution and to limit the rate at which fluids from the anode space 72 and the secondary cathode space 74 mix. In one example, the diffusion barrier comprises a non-permeable material having one or more holes or perforations that pass through the membrane to allow fluid from the anode space 72 and the secondary cathode space 74 to mix. In another example, the barrier comprises a porous material. In still another non-limiting example, the diffusion barrier comprises a micro-porous or a nano porous material. In some instances, the pores in the micro-porous material are sized to allow certain small ions to pass therethrough while preventing the passage of certain larger chemicals. In other example, the diffusion barrier comprises a cation-exchange membrane that transports cations which later pass through the ceramic cation-conductive membrane.

The diffusion barrier 70 can be placed in the anolyte compartment 52 between the secondary cathode 64 and the anode 58 in any suitable position. In some preferred embodiments, however, FIG. 5 shows the diffusion barrier 70 partitions the anolyte compartment 52 so that the anode space 72 has a larger volume than the secondary cathode space 74. Accordingly, in such embodiments, the barrier allows the anolyte side of the membrane to be protected while having little effect on the overall capacity or efficiency of the anode space.

FIG. 5 shows an embodiment in which the cell 50 further comprises first fluid inlet 76 that opens into the anode space 72 and a first fluid outlet 78 that opens from the anode space 72. Additionally, FIG. 5 shows an embodiment in which the cell 50 further comprises a second fluid inlet 80 that opens into the secondary cathode space 74 and a second fluid outlet 82 that opens from the secondary catholyte space 74. In such an embodiment, the anode space and the secondary cathode space may function as flow-through spaces that allow fluids to continuously pass through the spaces.

Where the anode space 72 and the secondary cathode space 74 allow fluids to flow through them, the fluid flowing through the anode space and the fluid flowing through the secondary cathode space may flow at any suitable speed. For example, the fluid in the anode space 72 and the fluid in the secondary cathode space 74 can flow through their respective spaces at the same or at different speeds. Indeed, the fluid in the anode space and the fluid in the secondary cathode space may flow at any suitable speed with respect to each other. In one non-limiting example, however, the fluid in the secondary cathode space 74 preferably flows at a slower flow rate than does the fluid in the anode space 72. In other words, in some instances, the fluid in the anode space has a shorter retention time in the cell than does the fluid in the secondary cathode space. As a result, the acidic fluid in the anode space is not given much opportunity to react with and/or to be neutralized by the higher pH fluid in the secondary cathode space. Moreover, by causing the fluid in the secondary cathode space to have a longer retention time than the fluid in the anode space, the cell allows the fluid in the secondary cathode space to be continuously treated by the secondary cathode in a manner that maintains the fluid in the secondary cathode space at a pH that is higher, and safer for the membrane, than the fluid in the anode space.

In another non-limiting example, the fluid in the anode space 72 has a longer retention time in anode space than the fluid in the secondary cathode space 74 has in the secondary cathode space. In other words, in this example, the fluid in anode space flows at a slower speed than does the fluid in the secondary cathode space. Accordingly, while the fluid in the anode space is given time to react and form desired chemical products, the fluid in the anode space is not given much opportunity to react with and/or be neutralized by the higher pH fluid in the secondary cathode space.

The diffusion barrier may be used with the cell in any suitable manner. In a non-limiting example, the diffusion barrier is used with the cell described in the first, second, and/or third non-limiting embodiments (discussed above). In this example, the diffusion barrier may limit the rate at which fluids in the secondary cathode space mix with and/or neutralize chemicals of the anode space.

Figure 6:
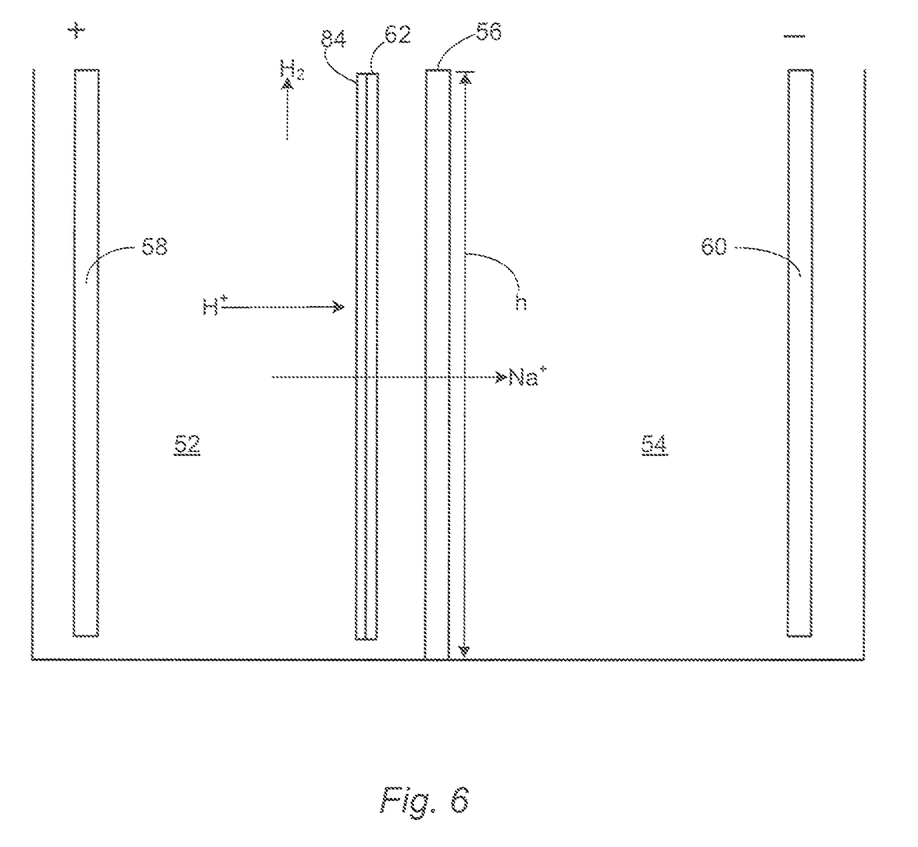
FIG. 6 depicts a schematic diagram of a representative embodiment of the electrochemical cell in which a side of the secondary cathode that faces the anode comprises an insulative separator.

FIG. 6 illustrates a fifth non-limiting embodiment in which the secondary cathode 62 comprises an insulative separator 84. While this separator 84 may be located in any suitable location, FIG. 6 shows an embodiment in which the insulative separator 84 is disposed on a side of the secondary cathode 62 that faces the anode 58.

The insulative separator 84 may serve any suitable purpose, including, but not limited to, decreasing the ability of the portion of the secondary cathode 62 that the separator covers to electrochemically reduce chemicals. Where the insulative separator decreases the ability of the portion of the secondary cathode that it covers to reduce chemicals, the separator may act to increase the cell's overall efficiency. For instance, where the secondary cathode 62 is operated to reduce protons to hydrogen gas (as described in the first non-limiting embodiment), to split water to produce hydroxyl ions (as described in the second non-limiting embodiment), or to reduce hydrogen peroxide to hydroxyl ions (as discussed in the third non-limiting embodiment), the insulative separator may allow such reactions to occur on the side of the secondary cathode that faces the membrane 56, while preventing (or reducing the likelihood of) such reactions at the side of the secondary cathode 62 that faces the anode 58. In this manner, the insulative separator 84 may allow the secondary cathode to maintain the pH of the fluid contacting the anolyte side of the membrane 56 at a suitable level, while having little effect on the anode's efficiency. For instance, where the separator 84 covers the side of the secondary cathode 62 that faces the anode 58, the insulative separator may prevent or reduce that side's ability to evolve hydroxyl ions, which could react with and neutralize protons evolved at the anode by forming water.

Where the secondary cathode 62 comprises an insulative separator 84, the insulative separator may comprise any suitable material that allows alkali cations to pass through the insulative separator while allowing the separator to decrease the ability of the portion of the secondary cathode that it covers to reduce chemicals. In some instances, the insulative separator comprises an electrically insulative separator (including, but not limited to a polymer) that electrically insulates the portion of the secondary cathode that it covers. In other instances, the insulative separator simply comprises a material that inhibits the occurrence of electrochemical reactions where the separator covers the secondary cathode. Some non-limiting examples of suitable materials that may be used for the insulative separator comprise a micro-porous mesh and/or a solid polymer electrolyte. In some embodiments, the insulative separator comprises one or more of nylon, polypropylene, PTFE, polyester, polycarbonates, PVDF, and the like.

Where the insulative separator 84 comprises a micro-porous mesh, the micro-porous mesh may comprise any suitable material that allows the separator to function as intended. In one non-limiting example, the separator comprises a micro-porous mesh, such as a CELGARD® separator, produced by Celgard, Inc., Japan. Similarly, where the separator comprises a solid polymer electrolyte, the separator may comprise any suitable material that allows the separator to function as intended. In one non-limiting example, the separator comprises a polyethylene oxide in which a suitable lithium salt (e.g., LiX, where the cell comprises a lithium-ion-conductive membrane, such as a LiSICON membrane) or sodium salt (e.g., NaX, where the cell comprises a sodium-ion-conductive membrane, such as a NaSICON membrane) is intermixed.

Figure 7:
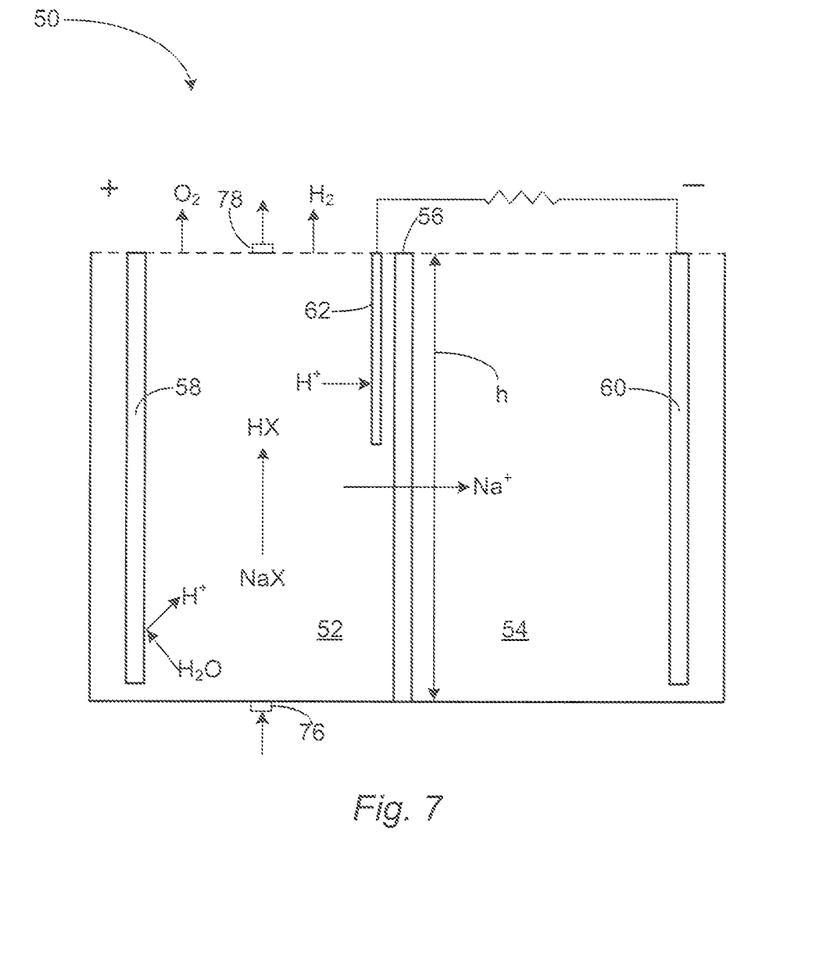
FIG. 7 depicts a schematic diagram of a representative embodiment of the electrochemical cell, wherein the secondary cathode only extends across a portion of an anolyte side of the cation-conductive membrane.
Figure 8:
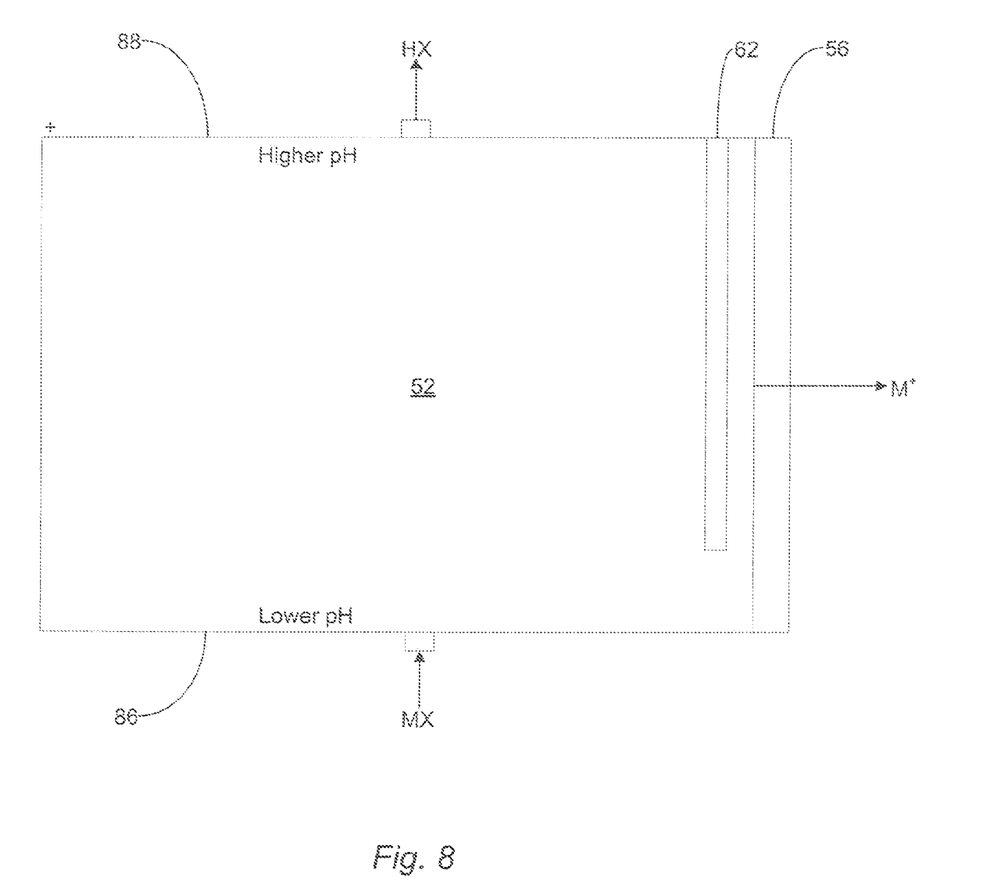
FIG. 8 depicts a schematic diagram of a representative embodiment of a flow-through anolyte compartment in the electrochemical cell.

While FIG. 6 illustrates an embodiment in which the secondary cathode 62 extends across the entire height "h" of the membrane 56, in some instances, the secondary cathode 62 only extends across a portion of the membrane's height h. For instance, FIG. 7 illustrates a non-limiting embodiment in which the cell 50 comprises a shortened secondary cathode 62 that only extends across a portion of the membrane's height h. The shortened cathode will also create less resistance to the transport of alkali ions from anode to the primary cathode compartment compared to the full sized cathode.

Where the secondary cathode 62 only extends across a portion of the anolyte side of the membrane 56, the secondary cathode may extend across any suitable portion of the membrane's anolyte side that allows the secondary cathode to maintain the pH of the fluid contacting the membrane at a suitable level. For instance, the secondary cathode may only extend across the portion of the membrane that would otherwise be exposed to the most acidic portion of the anolyte, or the portion of the anolyte having a pH that would damage the membrane or increase its resistance. By way of illustration, FIG. 8 illustrates a non-limiting embodiment of a portion of the anolyte compartment 52 and shows that as the anolyte solution (not shown) progresses through the anolyte compartment 52, the pH of the anolyte decreases. Specifically, FIG. 8 shows that where the anolyte comprises an alkali salt (MX) when introduced at a proximal side 86 of the anolyte compartment 52, a corresponding acid (HX) is released from the cell's distal side 88. Accordingly, while the pH of the anolyte near the proximal side 86 of the anolyte compartment 52 may be high enough for the membrane 56 to function efficiently, as the cell functions and the anolyte gets closer to the distal side 88 of the anolyte compartment 52, the pH of the anolyte may drop to a level that is detrimental to the membrane 56.

While the shortened secondary cathode 62 may extend across any suitable amount of the membrane, in some embodiments, the secondary cathode extends across less than about 99% of the height h of the membrane. In other embodiments, the secondary cathode extends across less than about 66% of the membrane's height h. In still other embodiments, the secondary cathode extends across less than about 33% of the membrane's height h. In yet other embodiments, the secondary cathode extends across less than about 25% of the membrane's height h.

Where the secondary cathode comprises a shortened cathode (or a secondary cathode that is shorter than the membrane's full height h), the shortened cathode can be used with any suitable cell and in any suitable manner. In one example, the shortened secondary cathode may be used in the cell discussed above in the first non-limiting embodiment to reduce protons to hydrogen gas. In another example, the shortened secondary cathode may be used in the second non-limiting embodiment discussed above to split water into hydroxyl ions and hydrogen gas. In still another example, the shortened secondary cathode may be used in the third non-limiting embodiment discussed above to reduce hydrogen peroxide to hydroxyl ions. In yet another example, the shortened secondary cathode may be used along with the diffusion barrier discussed in the fourth non-limiting embodiment. In a final non-limiting example, the shortened secondary cathode may be used along with the insulative separator from the fifth non-limiting embodiment, discussed above.

The described electrochemical cell may function to produce a wide range of chemical products, including, but not limited to, acids that correspond to alkali bases or alkali salts, substantially pure alkali metals, chlorine-based oxidant products, oxygen, chlorine, hydrogen, biofuels, and/or a variety of other chemical products. In one non-limiting example, the cells in the first through the sixth non-limiting embodiments (described above) are used to obtain one or more acids corresponding to alkali salts and/or to obtain one or more alkali metals. For simplicity, this example discusses using a sodium salt to produce an acid and/or to obtain an alkali metal. Nevertheless, the skilled artisan will recognize that this example can be modified to produce acids, alkali metals, and electrochemical products from another alkali salt, such as a lithium salt or a potassium salt.

In one non-limiting example, FIG. 7 shows that where the anolyte solution comprises a sodium salt (NaX) (including, but not limited to, sodium lactate ($NaC_3H_5O_3$), sodium nitrate ($NaNO_3$), sodium sulfate ($Na_2SO_4$), and/or sodium chloride (NaCl)), the salt can be disassociated in the anolyte compartment 52 into the salt's anion ($Na^+$) and its cation ($X^-$) (e.g., $C_3H_5O_3^-$, $NO_3^-$, $Cl^-$, etc.). FIG. 7 illustrates that the cation ($Na^+$) from the salt (NaX) may react with protons ($H^+$) evolved from the anode 58 to form an acid (HX) (e.g., lactic acid ($C_3H_6O_3$), nitric acid ($HNO_3$), hydrochloric acid (HCl), etc.) that corresponds to the original sodium salt (NaX). FIG. 7 further illustrates that the sodium cation ($Na^+$) is selectively transported through the cation-conductive membrane 56 (e.g., a NaSICON membrane) into the catholyte compartment 54, where it can be collected (e.g., as sodium metal, as sodium hydroxide, or in some other suitable form). Additionally, FIG. 7 illustrates that oxygen gas ($O_2$) and/or hydrogen gas ($H_2$) can be vented and/or collected from the anolyte compartment 52.

The described systems and methods can be varied in any suitable manner. In one non-limiting example, the cell may comprise both the diffusion barrier and a secondary cathode comprising the insulative separator. In another example, in addition to the described components, the electrochemical cell may comprise any other suitable component, such as a coolant system, a conventional pH controlling system (to control the addition of the base to the first space), etc. Indeed, because the described systems and methods may function best between about 15° and about 30° Celsius, in some preferred embodiments, the described cell is used with a coolant system.

In another example, the cell can comprise one or more sensors that measure the pH, temperature, chemical concentration, or other desired feature of the cell and/or its contents. In this example, the probes can be used to alter the operation of the cell. For instance, the sensors can communicate with a mechanism that is capable of increasing and/or decreasing the pH, temperature, chemical concentration, and/or another characteristic of one or more parts of the cell.

In still another example, additional chemical ingredients are added to the different areas of the cell for any suitable purpose (e.g., to modify fluid pH, to combat scaling on the electrodes and/or membrane, prevent corrosion of electrodes and/or membrane etc.). In yet another non-limiting example, effluents from one compartment or space are fed into another desired compartment or space, at any suitable time (e.g., any suitable time after the introduction of a feed stream into the cell), and in any suitable amount.

The present invention is also applicable to multi-compartment electrolytic or electrodialysis cells. One non-limiting example of a multi-compartment electrolytic cell is a three compartment cell. The cell comprises an anolyte compartment, a center compartment and a catholyte compartment. The anolyte compartment and center compartments are separated by an anionic or cationic membrane and the catholyte compartment and center compartments are separated by a NaSICON membrane.

During operation, the anolyte compartment comprising an aqueous solution and current is passed between an anode and a cathode. As the cell operates, water ($H_2O$) is split at the anode to form oxygen gas ($O_2$) and protons ($H^+$) through the reaction $2H_2O \rightarrow O_2 + 4H^+ 30\ 4e^-$. The protons formed in the anolyte compartment may back diffuse to the center compartment lowering the pH within the center compartment. As in the case of two compartment cells this lowering of pH will result in NaSICON-type membranes becoming less efficient or unable to transport sodium cations. In one example, the described systems and methods can be used to produce acids from impure alkali metal salts, e.g. sulfuric acid from sodium sulfate waste.

As previously mentioned, the described systems and method may maintain the pH of the fluid contacting the anolyte side of the membrane at any acceptable level or at any level that protects the membrane from being damaged or being made inefficient by the acidity of the anolyte. In some embodiments, the described systems and methods maintain the pH of the fluid contacting the anolyte side of the membrane above a pH of about 4. In other embodiments, the described systems and methods maintain the pH of the fluid contacting the membrane's anolyte side above a pH of about 4.5. In still other embodiments, the described systems and methods maintain the pH of the fluid contacting the membrane's anolyte side at a pH above about 5. In still other embodiments, the described systems and methods maintain the pH of the fluid in contact with the membrane's anolyte side above about 7. The pH of the fluid contacting the anolyte side of the membrane can be as high as 11.

The described systems and methods may also have several beneficial characteristics. In one example, the electrical potential between the secondary cathode and the anode is automatically adjusted to maintain the pH of the fluid in contact with the anolyte side of the membrane at an acceptable level. For instance, because the resistance of the membrane can increase as the pH of the fluid contacting the membrane decreases, the secondary cathode may draw an increased amount of current from the power supply. As the secondary cathode draws this increased amount of current, the secondary cathode may reduce an additional amount of protons to hydrogen gas (as described in the first non-limiting embodiment), may split an increased amount of water into hydroxyl ions and hydrogen gas (as described in the second non-limiting embodiment), may reduce an additional amount of hydrogen peroxide to hydroxyl ions (as described in the third non-limiting embodiment), or may otherwise raise the pH of the fluid in contact with the membrane to an acceptable level. As the pH of the fluid in contact with the membrane raises to an acceptable level, the membrane's resistance decreases and the secondary cathode is caused to draw less current. This process can be repeated as needed to maintain the pH of the fluid in contact with the anolyte side of the membrane at an acceptable level.

In another example, the described systems and methods protect the cation-conductive membrane from the low pH of the anolyte solution without greatly increasing the pH of the fluid in contact with the anode. Accordingly, the described systems and methods allow the cell to efficiently produce desired chemical products without damaging the membrane to same extent as would occur if the secondary cathode were not present.

While specific embodiments and examples of the present invention have been illustrated and described, numerous modifications come to mind without significantly departing from the spirit of the invention, and the scope of protection is only limited by the scope of the accompanying claims.

The invention claimed is:

1. An electrochemical cell, comprising:
an anolyte compartment for holding an anolyte solution, the anolyte compartment comprising an anode positioned to contact the anolyte solution;
a catholyte compartment for holding a catholyte solution, the catholyte compartment comprising a primary cathode positioned to contact the catholyte solution;
an alkali cation-conductive membrane positioned between the anolyte compartment and the catholyte compartment;
a secondary cathode disposed in the anolyte compartment between the anode and the cation-conductive membrane; and
wherein the anolyte compartment comprises an amount of hydrogen peroxide disposed between the cation-conductive membrane and the secondary cathode.

2. The electrochemical cell of claim 1, wherein the alkali cation-conductive membrane comprises a NaSICON membrane selective to sodium ions.

3. The electrochemical cell of claim 1, wherein the anolyte compartment comprises an anolyte solution comprising a sodium salt selected from sodium lactate, sodium sulfate, sodium nitrate, and combinations thereof.

4. The electrochemical cell of claim 1, wherein the secondary cathode extends across less than about 99% of a height of the cation-conductive membrane.

5. The electrochemical cell of claim 1, wherein the anolyte compartment comprises a fluid inlet that allows a fluid to be introduced and channeled between the secondary cathode and the cation-conductive membrane.

6. The electrochemical cell of claim 1, further comprising a diffusion barrier disposed in the anolyte compartment, wherein the diffusion barrier separates the anolyte compartment into an anode space that houses the anode, and a secondary cathode space that houses the secondary cathode.

7. The electrochemical cell of claim 6, wherein the diffusion barrier may be a porous film, a micro or nano porous separator, an ion-exchange membrane.

8. The electrochemical cell of claim 1, wherein the anolyte compartment comprises an amount of ammonium hydroxide disposed between the cation-conductive membrane and the secondary cathode.

9. The electrochemical cell of claim 1, wherein the secondary cathode comprises a different material than the primary cathode, and wherein the material of the secondary cathode allows the secondary cathode to evolve more hydrogen gas than the primary cathode.

10. The electrochemical cell of claim 1, wherein the secondary cathode comprises a first side that faces the cation-conductive membrane and a second side that faces the anode, wherein the second side comprises an insulative separator that allows the first side to reduce chemicals at a faster rate than the second side.

11. The electrochemical cell of claim 1, wherein the alkali cation-conductive membrane comprises a LiSICON membrane selective to lithium ions.

12. The electrochemical cell of claim 1, wherein the anolyte compartment comprises an anolyte solution comprising a lithium salt selected from lithium lactate, lithium sulfate, lithium nitrate, and combinations thereof.

13. An electrochemical cell, comprising:
an anolyte compartment for holding an anolyte solution, the anolyte compartment comprising an anode positioned to contact the anolyte solution;
a catholyte compartment for holding a catholyte solution, the catholyte compartment comprising a primary cathode positioned to contact the catholyte solution;
an alkali cation-conductive membrane positioned between the anolyte compartment and the catholyte compartment;
a secondary cathode disposed in the anolyte compartment between the anode and the cation-conductive membrane; and
wherein the anolyte compartment comprises an amount of ammonium hydroxide disposed between the cation-conductive membrane and the secondary cathode.

14. An electrochemical cell, comprising:
an anolyte compartment for holding an anolyte solution, the anolyte compartment comprising an anode positioned to contact the anolyte solution;
a catholyte compartment for holding a catholyte solution, the catholyte compartment comprising a primary cathode positioned to contact the catholyte solution;
an alkali cation-conductive membrane positioned between the anolyte compartment and the catholyte compartment;
a secondary cathode disposed in the anolyte compartment between the anode and the cation-conductive membrane;
a power supply in operable communication with the secondary cathode; and
wherein the secondary cathode comprises a first side that faces the cation-conductive membrane and a second side that faces the anode, wherein the second side comprises an insulative separator that allows the first side to reduce chemicals at a faster rate than the second side.

* * * * *